United States Patent

Ong et al.

[11] 3,923,457
[45] Dec. 2, 1975

[54] MIXTURES OF FIXING AUXILIARIES CONTAINING NOVEL DYE CARRIER

[75] Inventors: Sienling Ong, Lorsbach, Taunus; Max Grossmann; Ulrich Karsunky, both of Frankfurt am Main, all of Germany

[73] Assignee: Hoechst Aktiengesellschaft, Frankfurt am Main, Germany

[22] Filed: Oct. 10, 1973

[21] Appl. No.: 405,038

[30] Foreign Application Priority Data
Oct. 12, 1972 Germany............................ 2250017

[52] U.S. Cl. ................................ 8/169; 8/93; 8/173
[51] Int. Cl.².... D06P 1/60; D06P 5/04; C09B 67/00
[58] Field of Search ......... 8/174, 173, 93, 175, 176, 8/169; 260/410.5

[56] References Cited
UNITED STATES PATENTS

| | | | |
|---|---|---|---|
| 2,499,360 | 5/1947 | DeGroote et al. | 260/410.5 |
| 3,103,404 | 9/1963 | Salvin et al. | 8/175 X |
| 3,203,753 | 8/1965 | Sherburne | 8/175 X |
| 3,560,135 | 2/1971 | Yamaya et al. | 8/173 X |
| 3,619,271 | 11/1971 | Therwil et al. | 8/93 X |
| 3,663,161 | 5/1972 | Litzler et al. | 8/174 |
| 3,728,078 | 4/1973 | Freshwater et al. | 8/174 |
| 3,758,272 | 9/1973 | Datye et al. | 8/174 X |
| 3,811,830 | 5/1974 | DeMarco | 8/93 X |
| 3,837,802 | 9/1974 | Litzler et al. | 8/174 X |

FOREIGN PATENTS OR APPLICATIONS
1,054,746 1/1967 United Kingdom...................... 8/93

*Primary Examiner*—Benjamin R. Padgett
*Assistant Examiner*—David Leland
*Attorney, Agent, or Firm*—Curtis, Morris & Safford

[57] ABSTRACT

A mixture of fixing auxiliaries consisting of oxalkylated bisphenol A derivatives of the formula

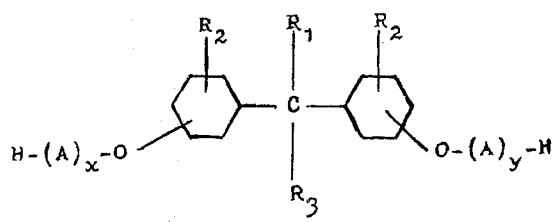

in which $R_1$ stands for a hydrogen atom or a methyl group, $R_2$ stands for a hydrogen atom or an alkyl group having 1 to 12 carbon atoms, $R_3$ stands for a hydrogen atom or an alkyl group having 1 to 18 carbon atoms, A stands for oxyethylene and/or oxypropylene and $x$ and $y$ are numbers the sum of which ranges between 4 and 50, and of oxethylated fatty alcohols of the formula $$R-O-(C-CH_2-CH_2-O)_z-H$$

in which R stands for an alkyl or an alkenyl group having 6 to 18 carbon atoms and $z$ is a number ranging from 4 to 25, and of polyethylene glycol having 2 to 25 units of ethylene oxide.

Printing pastes with disperse dyestuffs which contain these fixing auxiliaries have better printing properties and yield brilliant shades in excellent colour yield without notably affecting the fastness to light which occurred when using the carriers so far known. The emulsifying and dispersing effect of the oxyethylated fatty alcohol allows the carrier effect of the oxalkylated bisphenol A derivative to be fully developed. The polyglycol increased the efficiency of both constituents.

2 Claims, No Drawings

MIXTURES OF FIXING AUXILIARIES CONTAINING NOVEL DYE CARRIER

The present invention relates to mixtures of fixing auxiliaries.

The fixing of disperse dyestuffs on polyester cellulose-triacetate and mixtures thereof can be carried out, until now, either with hot air at from 165° to 230°C or with saturated steam at about 102° to 105°C or with steam pressure of from 1.0 to 2.5 atmg. Recently, the fixing is also effected in steam-fed fixing chambers at temperatures ranging from 105° to 200°C (high-temperature steamers), the steam pressure, however, corresponding to the atmospheric air (about 1 atm.). It is advantageous to use various accelerating agents, called carriers, during fixation in order to obtain a better dyestuff fixation. These carriers are mainly chosen according to the fixing conditions. As these fixing conditions change with the progress of the technical developments, the carrier must, accordingly, be newly chosen in each case.

Carriers that have been proposed are those on the basis of hydroxy-diphenyl, methylnaphthalene, alkyl esters of benzoic acid or salicylic acid or oxethylation products of alkyl phenols. Surface-active esterification products of carboxylic acid with high-molecular polyglycols (such as those described in German Auslegeschrift No. 1,138,735) may be used as fixing auxiliary agents.

Moreover, there may also be used alkylation products of fatty acids, fatty acid mono-esters or fatty amines (German Pat. No. 1,184,730) the fatty acids having been condensed in a molar ratio of 1:1 with butan-1,4-diol-penta-glycol ethers.

All these carriers have serious drawbacks in textile printing. Some of them soil the dyeings more or less as they can themselves be washed out of the fibrous material only with difficulty and to a limited extent, while preserving their excellent carrier effect, and therefore also deteriorate the fastness to light in many cases, whereas the last-mentioned products which do not have these drawbacks, have, generally, no sufficient carrier effect.

In the high temperature steaming apparatus these difficulties are even increased. In the presence of steam and at temperatures up to 190°C most of the fixing auxiliaries on the basis of carboxylic esters are saponified during the 4 to 8 minute treatment. This saponification even occurs at room temperature when the printing pastes are allowed to stand for a long time. In large plants in which rational operational methods are very much observed and the printing pastes are manufactured and stored in larger amounts, this saponification leads to considerable difficulties. The products lose their carrier effect and the dyestuff dispersions sometimes break whereupon the prints contain dots. As the pH is also changed in this case, the consistency of the printing pastes can inadvertantly be influenced when using for example thickening agents containing alginate. Disperse dyes containing amino groups even are precipitated in some cases by the formation of salt and, thus, become useless.

The present invention provides mixtures of fixing auxiliaries for textile printing having an improved effect and consisting of oxalkylated bisphenol A derivatives of the general formula

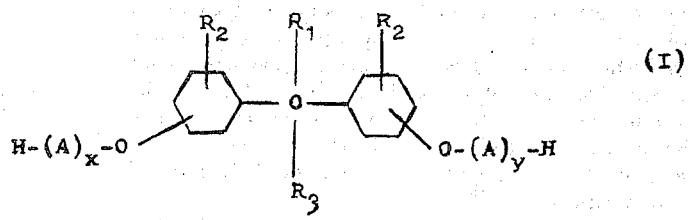

wherein $R_1$ stands for a hydrogen atom or a methyl group, $R_2$ stands for a hydrogen atom or an alkyl group having 1 to 12 carbon atoms, $R_3$ stands for a hydrogen atom or an alkyl group having 1 to 18 carbon atoms, A stands for oxethylene and/or oxypropylene and $x$ and $y$ are numbers the sum of which ranges between 4 and 50 and of oxethylated fatty alcohols of the general formula

wherein R stands for an alkyl or an alkylene group having 6 to 18 carbon atoms and $z$ stands for numbers ranging from 4 to 25.

The oxalkylates of the formula I are prepared by acid condensation of phenol or aklyl substituted phenols with low aliphatic aldehydes or ketones and following reaction with ethylene oxide and/or propylene oxide or mixtures thereof according to known methods.

Suitable alkyl phenols are, for example, cresols, butyl-, hexyl-, oxtyl-, monyl- or dodecyl- phenols the alkyl radicals of which may be linear or branched. Suitable aliphatid aldehydes are, for example, formaldehyde, butyl-, nonyl-, octa- decyl- aldeyhyde or mixtures thereof and suitable ketones are, preferably, acetone or methylethyl ketone. The oxethylated fatty alcohols are also obtained according to known methods by reacting fatty alcohols with ethylene oxide in the presence of basic catalysts.

The weight ratio of the two components is within the range of from 1:20 to 20:1, preferably 1:8 to 8:1.

It was also found that the colour yield could considerably be increased and the printing property of the printing paste could be improved when adding to the mixture of fixing auxiliary mentioned above polyethylene glycol having 2 to 25, preferably 8 to 15 units of ethylene oxide. When using those mixtures, which contain all the three components, the portion of oxalkylated bisphenol A derivative is advantageously 20–50 % by weight, of oxethylated fatty alcohol 2 to 20 % by weight and of polyethylene glycol 30 to 78 % by weight.

The mixture of fixing auxiliary is added to the printing pastes in an amount of from 10 to 50, preferably from 15 to 30 grams per kg of printing paste.

The dyestuff fixation is carried out in the usual manner with hot air at from 165° to 230°C, with pressure steam of 1.0 to 2.5 atmg. or with hot steam at from 140° to 190°C.

The material to be printed according to the present process is textile material, for example, woven or knitted fabrics or fiber fleeces, of cellulose-2½-acetate, cellulose triacetate or a high-molecular linear polyester, alone or blended for example, with wool, natural or regenerated cellulose. The fibrous material is preferably printed with products generally known under the name of disperse dyestuffs, for example, those selected from the class of the azo- or anthraquinone dyestuffs or those of the quinophthalone type.

The novel mixtures of fixing auxiliaries can also be used for pad-dyeing.

Printing pastes with disperse dyestuffs which contain the fixing auxiliaries of the invention, have better printing properties and yield brilliant shades in excellent colour yield without notably affecting the fastness to light which occurred when using the carriers so far known. The emulsifying and dispersing effect of the oxyethylated fatty alcohol allows the carrier effect of the oxalkylated bisphenol A derivative to be fully developed. The polyglycol increases the efficiency of both constituents.

The fixing auxiliaries of the invention are well watersoluble and can, therefore, be easily washed out of the fibrous material after fixation in the following aftertreatment baths. When used in screen printing they do not attack the screen varnish, they have good fastness to light and do not lead to flocculations in the printing pastes even when being stored over a longer period.

The following examples illustrate the invention; the parts and percentages are by weight, unless stated otherwise.

EXAMPLE 1

A fabric of polyethylene glycol terephthalate was pad-dyed on the padding machine with an aqueous liquor containing per liter 30 g of the disperse dyestuff of the formula

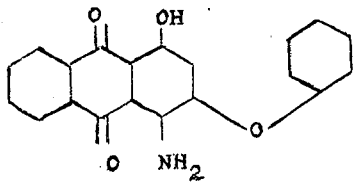

20 g of a mixture of
 30 parts of a reaction product of 1 mol of diphenylol propane and 25 mols of ethylene oxide,
 20 parts of a reaction product of 1 mol of coco fatty alcohol and 5 mols of ethylene oxide in
 50 parts of polyglycol (molecular weight 400)
and 100 g of alginate thickening (4 %).

The material was dried, fixed in hot air at 190°C for 60 seconds, rinsed, soaped and rinsed.

A brilliant red dyeing was obtained.

EXAMPLE 2

A fabric of polyethyleneglycol terephthalate was printed with a printing paste having the following composition: 60 g of the disperse dyestuff of the formula

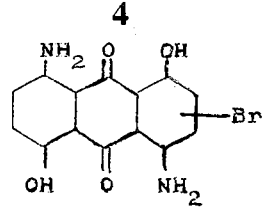

were, at first, pasted with 100 g of cold water and then dispersed with
 330 g of boiling water. This dispersion was introduced via a sieve in
 500 g of a stock thickening which consisted of a mixture of
 990 g of a 9 % non-ionic locust-flour thickening, and
 10 g of monosodium phosphate.
 ─────
 1000 g 20 g of a mixture of
 35 parts of a reaction product of 1 mol of diphenylol propane and 30 mols of ethylene oxide,
 60 parts of polyglycol (molecular weight 400) and
 5 parts of a reaction product of 1 mol of stearyl alcohol and 7 mols of ethylene oxide were then introduced.

The fabric was dried, steamed at 180°C for 6 minutes on the steaming apparatus at high temperatures, rinsed and soaped.

A brilliant blue print was obtained.

EXAMPLE 3

A fabric of cellulose tri-acetate was pad-dyed on a padding machine with an aqueous liquor which contained per liter 30 g of the disperse dyestuff of the formula

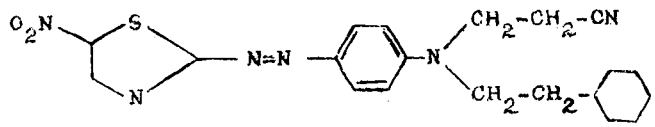

20 g of a mixture consisting of
 30 parts of a reaction product of 1 mol of coco fatty alcohol and 10 mols of ethylene oxide,
 20 parts of a reaction product of 1 mol of diphenylol propane and 15 mols of ethylene oxide and
 50 parts of polyglycol (molecular weight 600)
and 100 g of alginate thickening (4 parts of alginate in 100 parts of water).

The material was dried, fixed at 190°C for 60 seconds, rinsed, soaped and rinsed.

A brilliant dyeing was obtained in a high colour yield having good fastness properties.

We claim:

1. A mixture of fixing auxiliaries consisting of: (1) an oxalkylated bisphenol A derivative of the formula

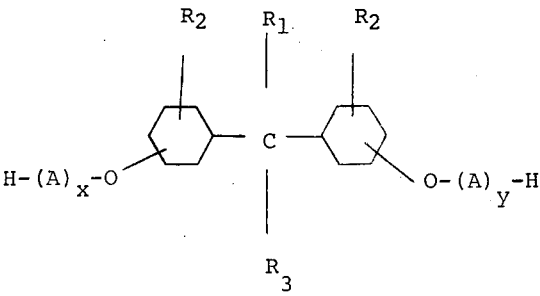

wherein $R_1$ is hydrogen or methyl, $R_2$ is hydrogen or alkyl having 1 to 12 carbon atoms, $R_3$ is hydrogen or alkyl having 1 to 18 carbon atoms, A is oxyethylene and/or oxypropylene and $x$ and $y$ are numbers the sum of which is between 4 and 50, (2) an oxethylated fatty alcohol of the formula $$R-O-(C-CH_2-CH_2-O)_z-H$$

wherein R is alkyl or alkenyl having 6 to 18 carbon atoms and $z$ is a number from 4 to 25, and (3) polyethylene glycol having 2 to 25 units of ethylene oxide.

2. A mixture of fixing auxiliaries as recited in claim 1, wherein said oxalkylated bisphenol A derivative is present in the said mixture in from 20 to 50% by weight, said oxethylated fatty alcohol is present in said mixture in from 2 to 20% by weight and said polyethylene glycol is present in said mixture in from 30 to 78% by weight, said mixture of fixing auxiliaries being used in printing pastes in from 10 to 50 grams per kilogram of printing paste.

* * * * *